(12) United States Patent
Kaminski et al.

(10) Patent No.: US 6,886,977 B2
(45) Date of Patent: May 3, 2005

(54) MEASURING TEMPERATURE IN STATIONARY COMPONENTS OF ELECTRICAL MACHINES USING FIBER OPTICS

(75) Inventors: Christopher Anthony Kaminski, Schenectady, NY (US); Konrad Roman Weeber, Rexford, NY (US); Thomas Bonner, Ballston Lake, NY (US); Todd Garrett Wetzel, Niskayuna, NY (US); John William Devitt, Mainville, OH (US); Veera Palanivelu Rajendran, Niskayuna, NY (US)

(73) Assignee: General Electric Company, Schenectady, NY (US)

(*) Notice: Subject to any disclaimer, the term of this patent is extended or adjusted under 35 U.S.C. 154(b) by 10 days.

(21) Appl. No.: 10/620,624

(22) Filed: Jul. 17, 2003

(65) Prior Publication Data

US 2005/0013342 A1 Jan. 20, 2005

(51) Int. Cl.[7] .......................... G01K 1/14; G01K 13/00; G02B 6/44
(52) U.S. Cl. .................... 374/152; 374/131; 374/161; 310/68 C; 385/13; 385/31; 318/471; 388/934; 250/227.14
(58) Field of Search ................ 374/152, 161, 374/131; 385/12, 13, 114, 101, 15, 31; 318/471; 388/934; 310/68 C; 250/227.14

(56) References Cited

U.S. PATENT DOCUMENTS

| | | | | |
|---|---|---|---|---|
| 2,717,945 A | * | 9/1955 | Briggs et al. ............ 310/68 C |
| 3,537,053 A | * | 10/1970 | Russell et al. ............ 374/152 |
| 4,319,298 A | | 3/1982 | Davis et al. ............ 361/24 |
| 4,547,826 A | | 10/1985 | Premerlani ............ 361/25 |
| 4,676,665 A | * | 6/1987 | Twerdochlib ............ 374/152 |
| 4,827,487 A | * | 5/1989 | Twerdochlib ............ 374/152 |
| 4,863,280 A | * | 9/1989 | Doemens ............ 374/152 |
| 5,232,285 A | * | 8/1993 | Mannik ............ 374/152 |
| 5,306,088 A | * | 4/1994 | Zoerner ............ 385/12 |
| 5,831,511 A | | 11/1998 | Manning et al. ............ 474/229 |
| 6,079,875 A | * | 6/2000 | Klass et al. ............ 385/12 |
| 6,173,090 B1 | * | 1/2001 | Simon et al. ............ 385/12 |
| 6,262,550 B1 | | 7/2001 | Kliman et al. ............ 318/565 |
| 6,399,949 B1 | | 6/2002 | Roney, Jr. et al. ........ 250/341.6 |
| 6,587,188 B2 | | 7/2003 | Gleine et al. ............ 356/32 |
| 6,721,470 B2 | * | 4/2004 | Bosselmann et al. ......... 385/12 |
| 2002/0196994 A1 | * | 12/2002 | Bosselmann et al. ......... 385/12 |
| 2003/0156777 A1 | * | 8/2003 | Bosselmann et al. ......... 385/12 |
| 2004/0114889 A1 | * | 6/2004 | Lee ............ 385/114 |

FOREIGN PATENT DOCUMENTS

| | | | |
|---|---|---|---|
| JP | 08080011 A | * 3/1996 | ............ H02K/11/00 |
| WO | WO 99/61875 | 12/1999 | |

OTHER PUBLICATIONS

C. Meunier et al.: "Industrial Prototype of a Fiber–Optic Sensor Network for the Thermal Monitoring of the Turbo-generator of a Nuclear Power Plant—Design, Qualification, and Settlement", J. Lightwave Technology, vol. 13, No. 7, Jul. 1995, pp. 1354–1361.*

H. Fevrier et al.: "A Temperature Optical Fiber Sensor Network: From Laboratory Feasibility To Field Trial", Conference Proceedings, 8th Optical Fiber Sensors Conference, Monterey, CA, Jan. 29–31, 1992, pp. 262–265.*

* cited by examiner

*Primary Examiner*—Diego Gutierrez
*Assistant Examiner*—Stanley J. Pruchnic, Jr.
(74) *Attorney, Agent, or Firm*—Nixon & Vanderhye P.C.

(57) ABSTRACT

A sensor measures temperature in stationary components of electrical machines using fiber optics. An optical fiber is embedded in a non-metallic ribbon. Notches are cut in the ribbon to effect bends that accommodate a shape of a stationary component. The ribbon and optical fiber are attached to the stationary component. A series of laser pulses can be injected from at least one end of the optical fiber, and the stationary component temperature can be monitored by interrogation of reflections from the series of laser pulses.

15 Claims, 3 Drawing Sheets

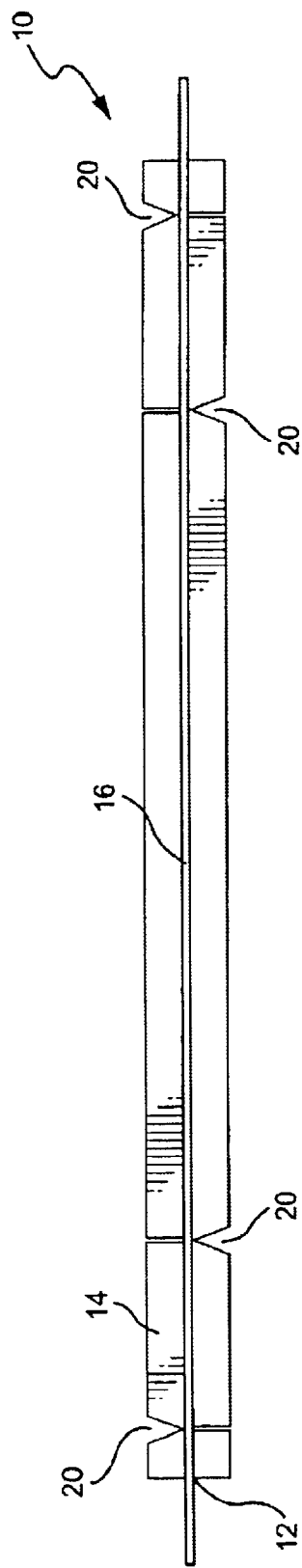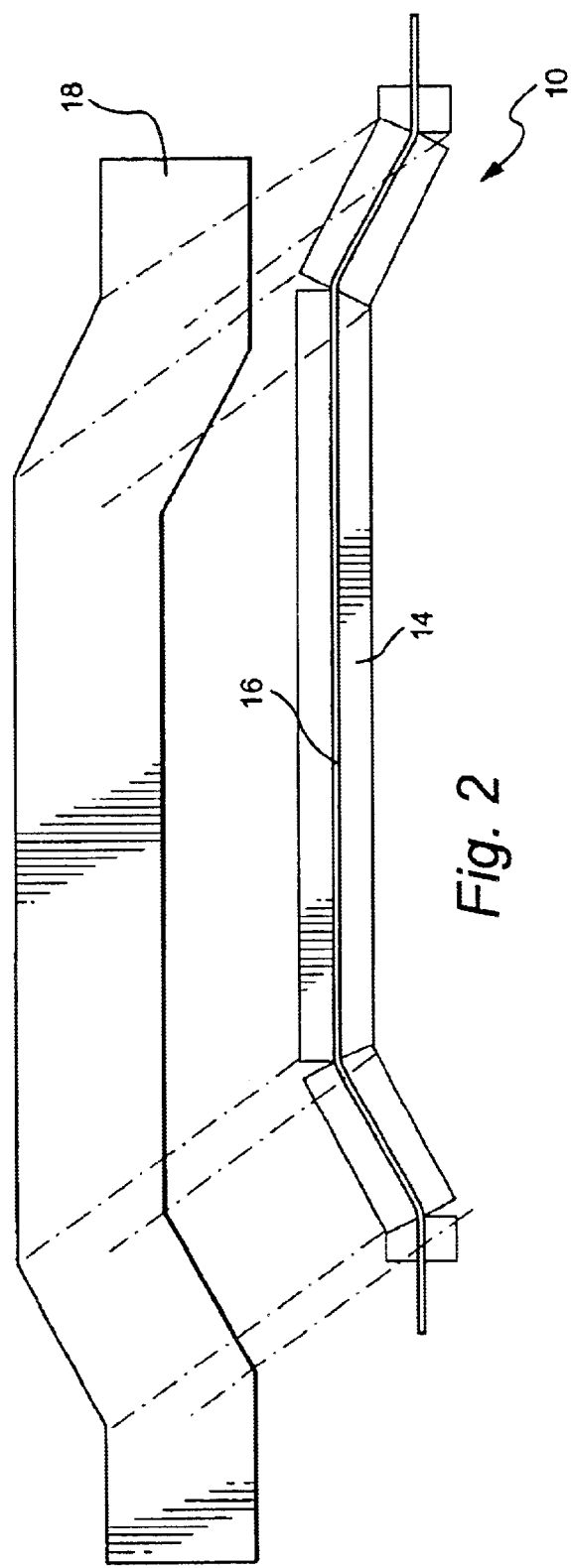

MEASURING TEMPERATURE IN STATIONARY COMPONENTS OF ELECTRICAL MACHINES USING FIBER OPTICS

BACKGROUND OF THE INVENTION

The present invention relates to measuring temperature in electrical machines using fiber optics and, more particularly, to monitoring winding temperatures by interrogation of reflections from a series of laser pulses injected into an optical fiber routed along an armature winding.

Current practice makes use of resistive temperature detectors (RTD's) to measure armature temperature. This provides local temperature information only at the location of the RTD and only at the outer surface of the armature bar or coil. Information about the actual copper temperature can be obtained only with thermocouples embedded in the copper strands. This requires that thermocouples be routed through the ground wall insulation, and this method is therefore applied only for special test purposes and rarely in production machines.

Location of hot spot is currently obtained by locating multiple RTD's in a stator slot along the stack length. This provides approximate information about the hot spot in the stator slot, but provides no information about winding temperature in the stator end windings.

Temperature measurement using fiber optics has been performed successfully in buried cables, but not with sufficient resolution to be useful for temperature monitoring of generator or motor windings. Other methods based on optical gratings placed at discreet locations have been shown to provide finer spatial resolution in aerospace applications. It would be desirable to find a way to make this principle work in the electrical winding in electrical machines, such as turbomachinery, hydrogenerators or electric motors, without compromising machine integrity.

BRIEF DESCRIPTION OF THE INVENTION

In an exemplary embodiment of the invention, a method of measuring temperature in stationary components of electrical machines using fiber optics is provided. The method includes the steps of (a) embedding an optical fiber in a non-metallic ribbon; (b) cutting notches in the ribbon to effect bends that accommodate a shape of a stationary component; (c) attaching the ribbon and optical fiber to the stationary component; (d) injecting a series of laser pulses from at least one end of the optical fiber; and (e) monitoring winding temperature by interrogation of reflections from the series of laser pulses.

In another exemplary embodiment of the invention, an apparatus for measuring temperature in stationary components of electrical machines includes an optical fiber embedded in a non-metallic material ribbon. Notches are formed in the ribbon to accommodate bends in a stationary component, and the ribbon is formed of a material with sufficient creep strength to support the optical fiber while preventing the optical fiber from being crushed.

BRIEF DESCRIPTION OF THE DRAWINGS

FIG. 1 shows an optical fiber embedded in a flat ribbon material;

FIG. 2 shows the shaped sensor being mounted on an armature bar;

DETAILED DESCRIPTION OF THE INVENTION

Figure 3:
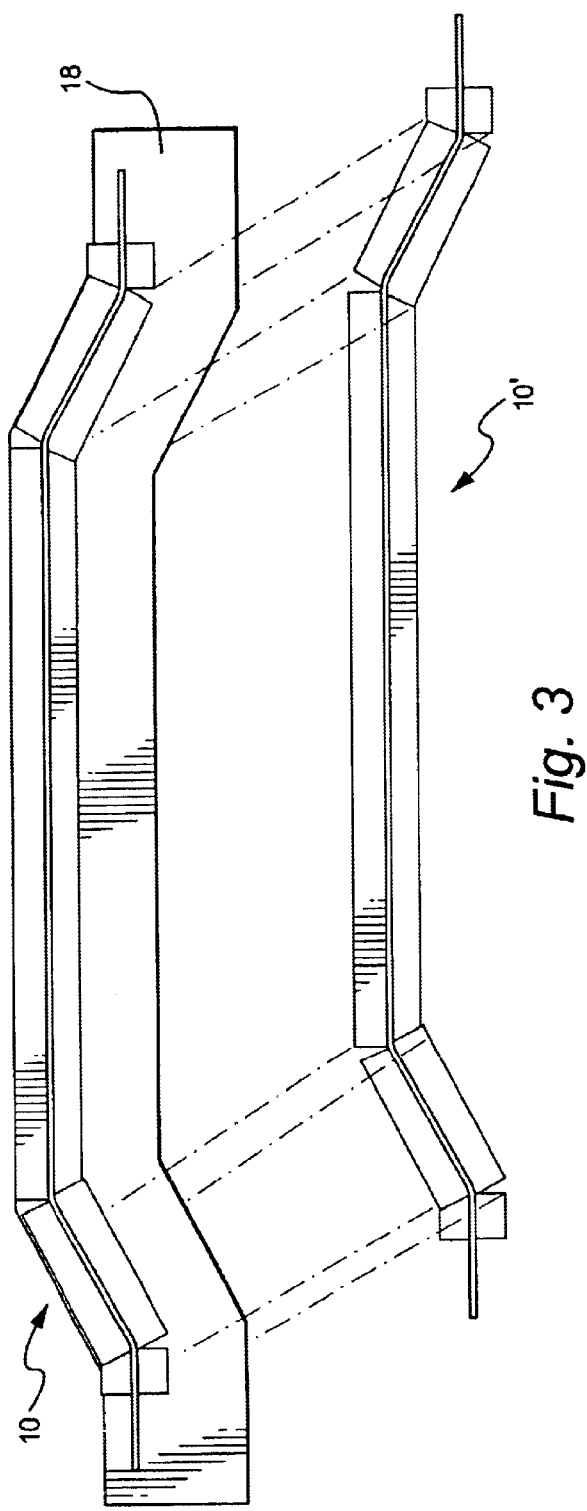
FIG. 3 shows a second shaped sensor being mounted on the armature bar.

FIGS. 1–3 show a double pass interrogation of a single armature bar including end arms along with a support structure that protects the fiber optic from damage during winding assembly and from the electromagnetic forces that are exerted on the bar during machine operation. To construct the sensor 10, a groove 12 is machined into a strip of flat ribbon material. An optical fiber 16 is placed in the machined groove 12 to embed the optical fiber 16 in the material 14. The optical fiber 16 is then secured in the ribbon material 14 with an adhesive such as epoxy.

The material of the flat ribbon 14 should have sufficient creep strength to support the fiber 16 without crushing it. Preferably, the material is a non-metallic material that is compatible with an adhesive resin such as a two-part epoxy paste adhesive.

As shown in FIG. 2, a width of the ribbon material 14 is preferably about one-half the height of a bare armature bar 18. The ribbon material 14 is cut into lengths slightly longer than one-half of MLT (mean length turn) of one coil. Notches 20 are formed in the ribbon so that it can be bent to accommodate involutes on the turbine and collector ends of the bar 18.

As shown in FIG. 2, a first sensor 10 is then attached to the side of the bare bar 18 after the end arms have been formed by lining up the top edge of the ribbon 14 with the top edge of the bar 18. With reference to FIG. 3, a second sensor 10' is then secured to the bar 18 by aligning its lower edge with the bottom of the bar 18. Preferably, the sensors 10, 10' are secured to the bar 18 via an adhesive such as epoxy or the like. Although FIG. 3 illustrates a preferred embodiment utilizing two sensors 10, 10' secured to the bar 18, a single sensor 10 may alternatively be centrally disposed on the bar or three or more sensors may be secured to the bar for higher radial resolution. If only one bar is to be monitored, the fibers on the turbine end can be connected together (after the series loops are brazed), and the connected fibers can be brought out of the machine on the collector end, preferably along a neutral connection lead.

Series loops are the electrical connections between the ends of top and bottom bars at the axial extremes of the stator. The top and bottom bars emanate from different stator slots and typically follow a path on a conical surface where they become circumferentially and axially aligned, with the top bar being at a smaller radial distance from the axis of rotation the bottom bar. Series loops consist comprise electrical components, typically copper, which connect the top bar with the bottom bar. The series loop connector is attached to the top and bottom bars by means of brazing to assure a connection that is good both electrically and mechanically.

Figure 4:
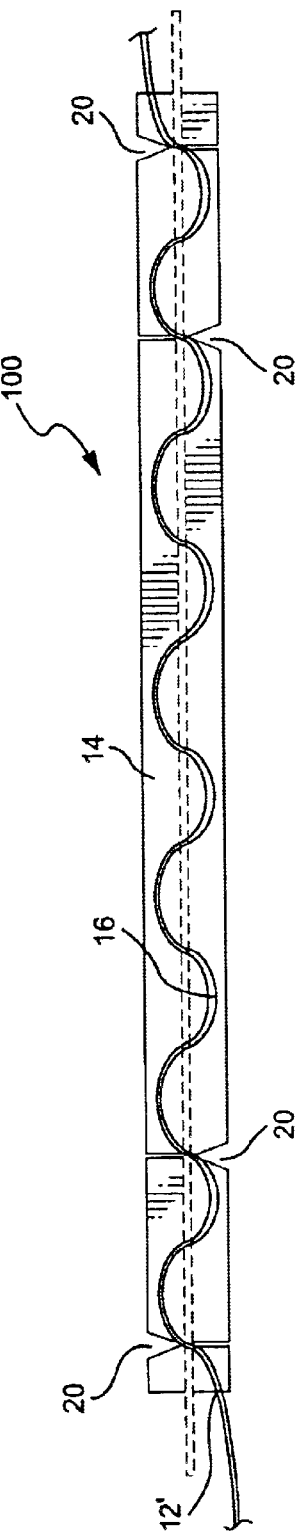
FIG. 4 shows an alternative embodiment of the sensor including a sinusoidally disposed optical fiber.

FIG. 4 illustrates an alternative construction of the sensor. In this construction, the sensor 100 is machined with a substantially sinusoidally shaped groove 12' such that the optical fiber 16 is embedded in the ribbon material 14 in a sinusoidal shape. This arrangement not only provides a wider radial average of temperature measurement but also provides strain relief of the optical fiber 16 against thermal expansion of the copper bar. As shown in FIG. 4, the pitch of the sinusoidal wave in the optical fiber 16 is preferably adjusted so that the notches 20 fall at the nodes of the wave.

Once constructed and installed, laser pulses can be injected from both ends of the optical fiber 16, and the winding temperatures can be monitored by interrogating the reflections from the series of laser pulses. Temperature monitoring by interrogation of reflections from a series of laser pulses injected into an optical fiber is known, and the details thereof will not be further described.

The sensors in the present invention can be routed along the full length or some portion of the armature winding. In one arrangement, the sensors can be routed along the bar on the outside of the insulation, which, in addition to getting a complete temperature profile of the bar, allows direct comparison with RTD readings. Alternatively, the sensor can be routed under the stator ground wall insulation so as to get direct distributed temperature readings of the copper in the bar.

Figure 5:
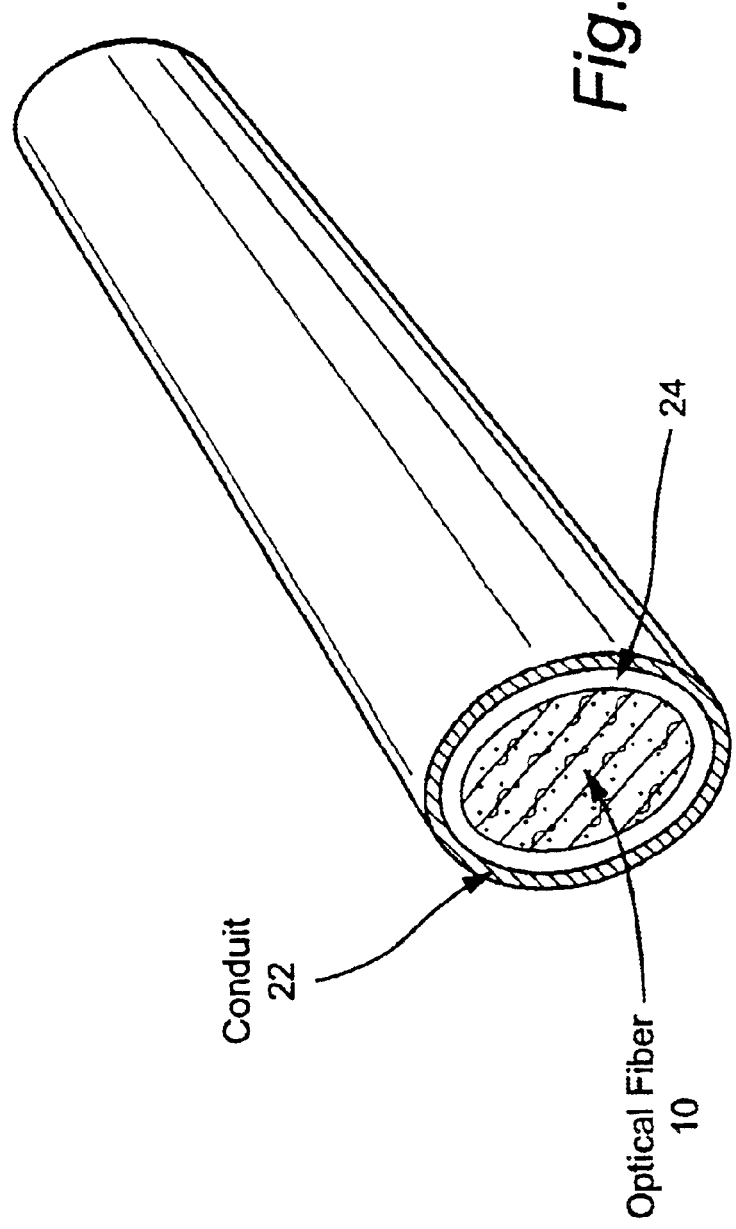
FIG. 5 shows an alternative arrangement.

In an alternative arrangement, with reference to FIG. 5, the sensor 10 can be routed through a hollow cable or conduit 22 embedded within the bar so that the optical fiber can be inserted after braze joints have been made between individual pairs of bars that make up the armature winding. A clearance 24 is provided for axial movement. In one embodiment, the clearance 24 is filled with a lubricant, such as grease. This construction protects the optical fiber from exposure to the high temperatures required for brazing.

By embedding the optical fiber 16 in the flat ribbon material 14 with rectangular cross section, the fiber can be attached to the side of the bar without compromising the outward rectangular construction of the original bar. Narrow bulges created by the presence of either a single or double row of unprotected fiber could undermine the ability of a slot support system to restrain movement of the armature bars, or alternatively could result in crushing of the optical fiber 16.

By injecting laser pulses from both ends of the optical fiber 16, the spatial resolution of the temperature readings can be improved. Additionally, injecting laser pulses from both ends of the optical fiber increases reliability of the measurements in that data can be obtained over the full length of the interrogated path, even if a break occurs at any location along the path of the optical fiber. The path along which the optical fiber is laid out may be segregated into N separately interrogated lengths, one for each phase of an N-phase winding. Alternatively, a single path may be formed along which the optical fiber is laid out along all N phases of a delta-connected winding. By injecting laser pulses through the ground wall insulation at the low voltage end of the stator winding close to the neutral end of the winding, insulation integrity can be maintained in all other sections of the winding that are electrically stressed.

On a two circuit winding, the optical fiber may be routed such that the optical fiber forms a single path extending down one circuit and returning along the parallel circuit of the same phase, with the fiber routed in and out close to the neutral end of that phase. This arrangement allows penetration of the ground wall insulation at the low voltage end of the circuit. This routing pattern may be repeated on several or each phase of an N-phase winding.

Alternatively, the optical fiber on a two circuit winding can be routed such that the optical fiber forms a single path extending down one leg of one winding circuit, starting at the lower voltage end of the winding and returning along the parallel circuit of the same phase back to the low voltage end of the winding, this being repeated on each phase.

In a similar context, the optical fiber can be routed on any multi-circuit winding comprising an even number of circuits 2N by routing the optical fiber as a single series connected path, proceeding up one circuit and returning on the other N times so that the full length of each circuit has been interrogated. With an odd number 2N+1 circuits, the optical fiber can be routed as a single series connected path, proceeding up one circuit and returning on the other N times with the routing on the remaining unpaired circuit being both out and back along the same bars, so that the full length of each circuit has been interrogated at least once.

The optical fibers can be routed out of the machines along the connection leads so that the laser pulses can be applied external to the machine. In hydrogen cooled machines, the optical fibers can be routed out the connection leads through the high voltage bushings or through instrumentation glands so that the laser pulses can be applied external to the machine.

As noted, the optical fiber can be routed along selected bars noted to obtain a sample of typical armature bar performance along a typical armature bar. Similarly, the optical fiber can be routed along selected bars in both directions so as to form a loop open on one of the bars, with half the loop being near one radial or azimuthal extremity of the bar and the half of the loop being nearer the other extremity.

In multi-turn coils, the optical fibers can be routed along individual turns. Additionally, the optical fiber can be routed along the surface of insulated connection rings of armature windings to measure their surface temperature or embedded under the ground wall insulation of connection rings to measure their copper temperature. The optical fiber can still additionally be routed along the top of stator wedges, stator teeth or the back of the core to obtain temperature profiles of selected regions of the stator core as well as of the cooling gas in the air gap of the machine. The optical fiber can still additionally be routed along structural components of the stator such as frame elements, the stator flange, terminal box elements, and stationary elements of bearings to obtain temperature profiles of these selected regions of the stator of the machine.

With the sensor of the invention, temperature information throughout stationary components of an electric machine can be obtained either during temporary test phases or during continuous operation to facilitate continuous (both in time and space) machine monitoring and diagnostics. The continuous or discreet data of operational temperatures measured in the machine with the sensor of the invention can be employed in a generator parts life assessment model that determines the expected life remaining in each component based on the temperatures that these components are exposed to during the operation of the machine. The results of this parts life assessment model can be employed to schedule preventive maintenance and refurbishment of the monitored generator components.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of measuring temperature in stationary components of electrical machines using fiber optics, the method comprising:

(a) embedding an optical fiber in a non-metallic ribbon;

(b) cutting notches in the ribbon in a width direction to effect bends that accommodate a shape of a stationary component;

(c) attaching the ribbon and optical fiber to the stationary component;

(d) injecting a series of laser pulses from at least one end of the optical fiber; and (e) monitoring stationary component temperature by interrogation of reflections from the series of laser pulses.

2. A method according to claim 1, wherein the stationary component is an armature bar, and wherein insulation is provided surrounding the armature bar, and wherein step (c) is practiced by attaching the ribbon and optical fiber on an outside of the insulation.

3. A method according to claim 1, wherein the stationary component is an armature bar, and wherein step (c) is practiced by attaching the ribbon and optical fiber directly to the armature bar.

4. A method according to claim 1, wherein step (a) is practiced by arranging the optical fiber embedded in the ribbon in a sinusoidal configuration.

5. A method according to claim 1, wherein step (d) is practiced by injecting the series of laser pulses from both ends of the optical fiber.

6. A method according to claim 1, wherein insulation is provided surrounding the stationary component, and wherein step (d) is practiced by injecting the series of laser pulses through the insulation at a low voltage end of the windings close to a neutral end of the windings.

7. A method according to claim 1, wherein the stationary component is an armature bar, and wherein step (c) is practiced by routing the optical fiber on a multi-circuit winding having an even number of circuits (2N) by routing the optical fiber as a single series connected path, proceeding up one circuit and returning on the other N times.

8. A method according to claim 1, wherein the stationary component is an armature bar, and wherein step (c) is practiced by routing the optical fiber on a multi-circuit winding having an odd number of circuits (2N+1) by routing the optical fiber as a single series connected path, proceeding up one circuit and returning on the other N times, with routing on the remaining unpaired circuit being both out and back along the same bars.

9. A method according to claim 1, further comprising routing the optical fiber out of the machine along connection leads, thereby enabling the series of laser pulses to be applied external to the machine.

10. A method according to claim 1, wherein step (c) is practiced by attaching at least a second ribbon and a corresponding second optical fiber to the stationary component.

11. An apparatus for measuring temperature in stationary components of electrical machines, the apparatus comprising an optical fiber embedded in a non-metallic material ribbon, wherein notches are formed in the ribbon in a width direction to accommodate bends in a stationary component, and wherein the ribbon is formed of a material with sufficient creep strength to support the optical fiber while preventing the optical fiber from being crushed.

12. An apparatus according to claim 11, wherein the optical fiber is embedded in the ribbon in a sine wave configuration.

13. An apparatus according to claim 12, wherein the notches coincide with nodes of the sine wave.

14. An apparatus according to claim 11, further comprising a second ribbon and a corresponding second optical fiber.

15. An apparatus according to claim 11, wherein the stationary component is an armature bar, and wherein a height of the ribbon is about one half a height of the armature bar.

\* \* \* \* \*

UNITED STATES PATENT AND TRADEMARK OFFICE
CERTIFICATE OF CORRECTION

PATENT NO. : 6,886,977 B2
DATED : May 3, 2005
INVENTOR(S) : Kaminski et al.

It is certified that error appears in the above-identified patent and that said Letters Patent is hereby corrected as shown below:

<u>Column 2,</u>
Line 52, after "rotation" insert -- than --; after "loops" delete "consist".

Signed and Sealed this

Sixteenth Day of August, 2005

JON W. DUDAS
*Director of the United States Patent and Trademark Office*